(12) United States Patent
Ikemoto et al.

(10) Patent No.: US 6,619,329 B2
(45) Date of Patent: Sep. 16, 2003

(54) HOSE

(75) Inventors: Ayumu Ikemoto, Komaki (JP); Hidehito Ikeda, Kasugai (JP); Kazutaka Katayama, Komaki (JP); Motoshige Hibino, Komaki (JP); Yoshio Okado, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 151 days.

(21) Appl. No.: 09/968,712

(22) Filed: Oct. 2, 2001

(65) Prior Publication Data

US 2002/0074050 A1 Jun. 20, 2002

(30) Foreign Application Priority Data

| Oct. 3, 2000 | (JP) | 2000-304080 |
| Oct. 3, 2000 | (JP) | 2000-304081 |
| Oct. 3, 2000 | (JP) | 2000-304082 |
| Jan. 25, 2001 | (JP) | 2001-017537 |
| Jan. 25, 2001 | (JP) | 2001-017538 |
| Jan. 25, 2001 | (JP) | 2001-017539 |

(51) Int. Cl.$^7$ .............................................. F16L 11/10
(52) U.S. Cl. ..................... 138/126; 138/134; 138/137; 138/143; 138/146; 428/36.91
(58) Field of Search ...................... 138/125, 126, 138/137, 141, 127, 134, 143, 146; 428/36.91

(56) References Cited

U.S. PATENT DOCUMENTS

| 4,101,699 A | * | 7/1978 | Stine et al. ................. 138/141 |
| 4,207,364 A | * | 6/1980 | Nyberg ....................... 138/141 |
| 4,633,912 A | * | 1/1987 | Pilkington et al. .......... 138/137 |
| 4,822,654 A | * | 4/1989 | Takemura et al. ......... 428/36.8 |
| 4,905,736 A | * | 3/1990 | Kitami et al. ............... 138/137 |
| 5,362,530 A | * | 11/1994 | Kitami et al. ............... 138/126 |
| 5,380,571 A | * | 1/1995 | Ozawa et al. ............... 138/137 |
| 5,472,746 A | * | 12/1995 | Miyajima et al. ........... 138/137 |
| 5,488,975 A | | 2/1996 | Chiles et al. ............... 138/125 |
| 5,566,720 A | * | 10/1996 | Cheney et al. ............. 138/141 |
| 5,710,240 A | * | 1/1998 | Steinmann ................. 528/289 |
| 5,962,683 A | * | 10/1999 | Steinmann et al. ......... 544/180 |
| 6,166,218 A | * | 12/2000 | Ravichandran et al. .... 548/257 |
| 6,179,008 B1 | * | 1/2001 | Kawazura et al. .......... 138/126 |
| 6,225,375 B1 | * | 5/2001 | Thibaut et al. ............. 523/223 |
| 6,279,615 B1 | * | 8/2001 | Iio et al. ..................... 138/137 |

FOREIGN PATENT DOCUMENTS

| JP | 05-138822 | 6/1993 |
| JP | 10-019173 | 1/1998 |
| JP | 2000-018440 | 1/1998 |
| JP | 2001-040158 | 2/2001 |
| WO | WO 00/07810 | 2/2000 |

OTHER PUBLICATIONS

European Search Report dated Feb. 20, 2002.

* cited by examiner

*Primary Examiner*—James Hook
(74) *Attorney, Agent, or Firm*—Armstrong, Westerman & Hattori, LLP (57) ABSTRACT

A hose comprising a laminate including a rubber layer comprising a rubber composition containing as essential components (A) a rubber made of at least one material selected from the group consisting of an ethylene-propylene-diene terpolymer and an ethylene-propylene copolymer, (B) a vulcanizing agent containing a peroxide, (C) a resorcinol compound, and (D) a melamine resin; and a layer made of at least one material selected from the group consisting of a polyamide resin, an ethylene-vinyl alcohol copolymer, and a metal. In such hose, the rubber layer and the non-rubber layer made of the polyamide resin, the ethylene-vinyl alcohol copolymer, or of the metal adhere well to each other, without applying an adhesive to an interface therebetween.

5 Claims, 5 Drawing Sheets

HOSE

BACKGROUND OF THE INVENTION

1. Field of the Invention

The present invention relates to hoses, and, more particularly, to automobile hoses such as a gasoline fuel hose, fuel cell automobile hoses such as a methanol fuel hose and a hydrogen fuel hose, engine cooling hoses such as a radiator hose and a heater hose, and a refrigerant conveying hose such as used in a cooler.

2. Description of the Art

Conventional automobile hoses including a gasoline fuel hose utilize the following hoses (1), (2) and the like based on their battery liquid resistance, anti-chipping, flame resistance, and low cost. Hose (1) has an inner layer made of a polyamide resin, and an outer layer made of rubber comprising an ethylene-propylene-diene terpolymer (EPDM) formed on an outer peripheral surface of the inner layer. Hose (2) has an inner layer made of polyamide resin, an intermediate layer made of ethylene-vinyl alcohol copolymer (EVOH) formed on an outer peripheral surface of the inner layer, and an outer layer made of EPDM formed on an outer peripheral surface of the intermediate layer.

In the hose (1), the rubber outer layer is adhered to the outer peripheral surface of the polyamide resin inner layer with an adhesive. Due to unevenness of the adhesive coating, the rubber layer and the polyamide non-rubber layer tend to be adhered insufficiently, resulting in a decreased sealing property. In the hose (2), the rubber outer layer is adhered to the outer peripheral surface of the EVOH intermediate layer with an adhesive. Due to coating unevenness of the adhesive, the rubber layer and the EVOH non-rubber layer are adhered insufficiently, resulting in a decreased sealing property. In addition, for producing the above-mentioned conventional hoses (1) and (2), a step of coating the adhesive is required. Accordingly, the production becomes complex, costs are increased, a pot life and a concentration of the adhesive should be controlled. Thus, stable productivity of the hoses cannot be achieved. Furthermore, the adhesive typically is diluted with an organic solvent, i.e., toluene, which may cause environmental pollution.

SUMMARY OF THE INVENTION

Accordingly, it is an object of the present invention to provide a hose comprising a rubber layer and a non-rubber layer that adhere well to each other without applying an adhesive to an interface therebetween.

The present invention provides a hose, comprising a laminate including
  a rubber layer comprising a rubber composition containing as essential components (A)–(D), wherein:
    (A) a rubber made of at least one material selected from the group consisting of an ethylene-propylene-diene terpolymer and an ethylene-propylene copolymer,
    (B) a vulcanizing agent containing a peroxide,
    (C) a resorcinol compound, and
    (D) a melamine resin; and
  a layer made of at least one material selected from the group consisting of a polyamide resin, an ethylene-vinyl alcohol copolymer, and a metal.

The present inventors intensively studied providing a hose comprising a rubber layer and a non-rubber layer that adhere well to each other without applying an adhesive to an interface therebetween. The studies have investigated to an idea that an adhesive is mixed into a rubber composition which is used in the rubber layer. A combination capable of providing an excellent adhesion of the rubber and the adhesive has also been studied. As the rubber, EPDM and an ethylene-propylene copolymer (EPM) have been selected because they are relatively inexpensive. An adhesive containing certain components, i.e., a resorcinol compound and a melamine resin, then is mixed with the rubber, and is vulcanized using a vulcanizing agent containing a peroxide. When the mixed and vulcanized rubber layer is laminated with a non-rubber layer such as a polyamide resin layer, excellent adhesion between the layers can be obtained. Thus, the inventors attained the present invention. The reason why the rubber layer comprising the specific rubber composition adheres well to the non-rubber layer such as a polyamide resin layer is presumed as follows: The resorcinol compound functions mainly as an adhesive, while the melamine resin functions mainly as an adhesive adjuvant. The resorcinol compound receives a $CH_2O$ group from the melamine resin. The $CH_2O$ group is covalently bonded to a polyamide group (—CONH—) of the polyamide resin, EVOH, or a metal, thereby improving the adhesion. For example, the resorcinol compound represented by the following formula (C) receives the $CH_2O$ group from the melamine resin to provide the compound represented by the following formula (C'). The compound (C') is covalently bonded to the polyamide group (—CONH—) of the polyamide resin as shown. It is considered that such covalent bond provides strong adhesion. Further, a portion of hydroxyl groups in the resorcinol compound are hydrogen bonded to the polyamide groups of the polyamide resin. The hydrogen bond also relates to improvement in adhesion.

Moreover, when a mixing ratio of the resorcinol compound (C) and the melamine resin (D) is within a predetermined range, or when a mixing percentage of the resorcinol compound (C) to the specified rubber (A) is within a predetermined range, adhesion between the rubber layer and the polyamide resin layer is further improved.

According to the present invention, the hose comprises the laminate structure including the rubber layer comprising the specific rubber composition, and the non-rubber layer, i.e., the polyamide resin layer, the EVOH layer, or the metal layer. The rubber layer itself has an adhesive property, and therefore excellent adhesion between the rubber layer and the non-rubber layer can be obtained without applying the adhesive therebetween. In addition, in a method for producing the hose of the present invention, the method does not require a step of coating the adhesive, since no adhesive is used. Accordingly, pot life and a concentration of the adhesive need not to be controlled, and thus stable productivity is achieved. Furthermore, no organic solvent is used for diluting the adhesive, and therefore no environmental pollution is caused. In the production of the hose according to the present invention, vulcanization is performed using, not the conventional sulfur vulcanizing agent, but rather using the peroxide vulcanizing agent. Accordingly, no zinc oxide is used. Even though the rubber layer is used as an inner layer of the hose, hose failure such as clogging and liquid spill on a sealing portion can be avoided.

Further objects, features and advantages of the present invention will become apparent from the following description of the preferred embodiments with reference to the attached drawings.

DESCRIPTION OF THE PREFERRED EMBODIMENTS

Embodiments of the present invention will be explained in more detail in the following with reference to the drawings.

Figure 1:
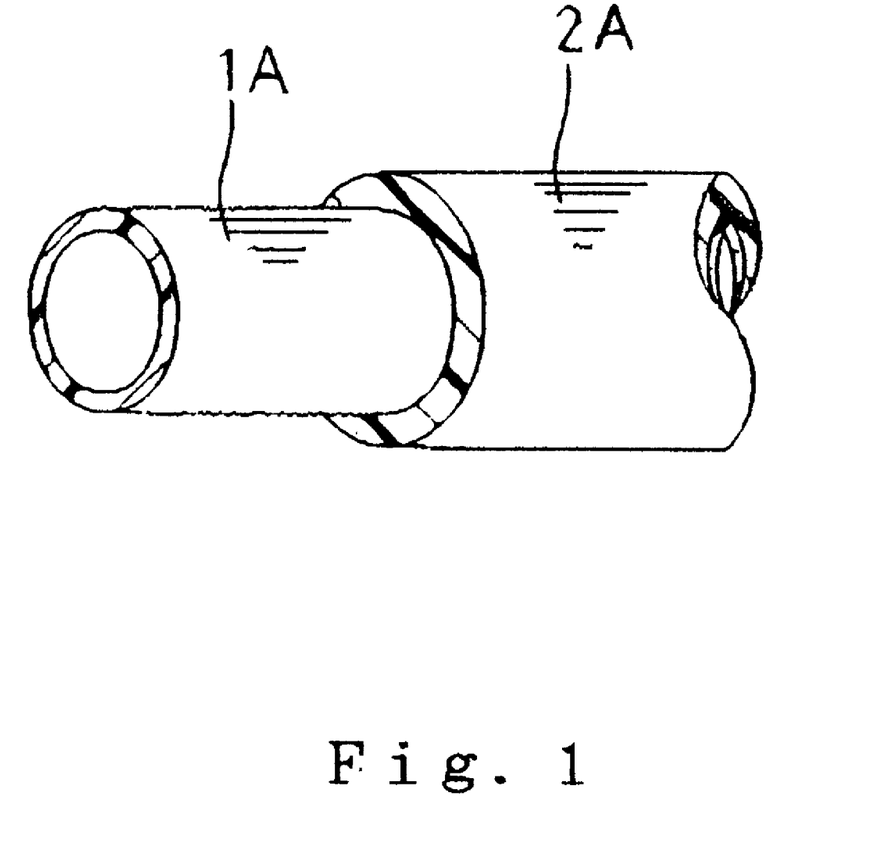
FIG. 1 is a perspective view showing one embodiment of a hose according to the present invention having a laminate structure of a rubber layer and a polyamide resin layer.
Figure 2:
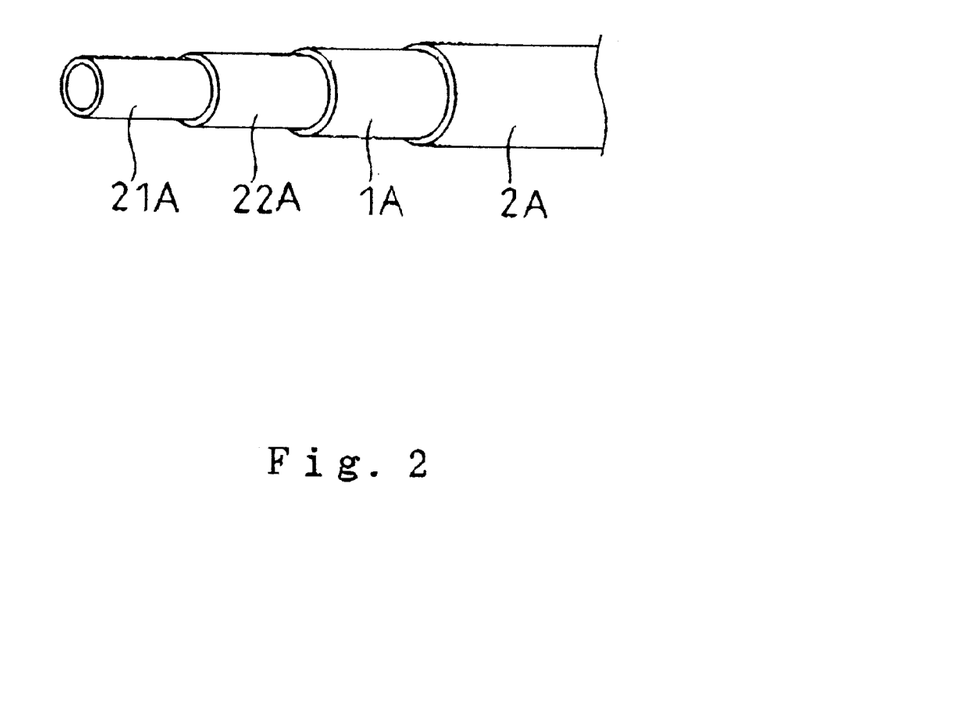
FIG. 2 is a perspective view showing another embodiment of a hose according to the present invention having a laminate of a rubber layer and a polyamide resin layer.
Figure 3:
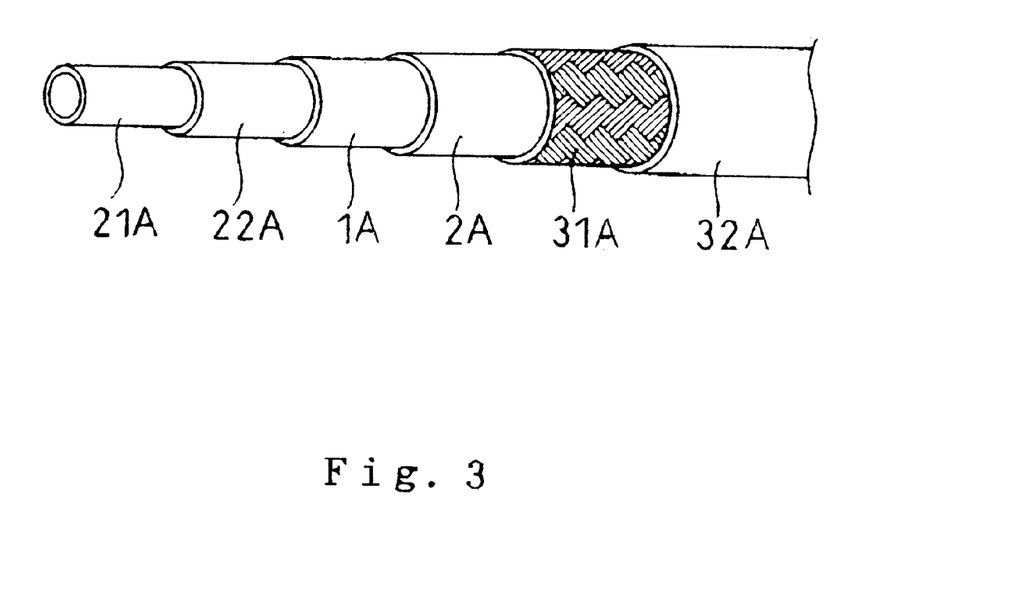
FIG. 3 is a perspective view showing yet another embodiment of a hose according to the present invention having a laminate structure of a rubber layer and a polyamide resin layer.

Referring to FIGS. 1 to 3, a hose according to the present invention having a laminate structure of a rubber layer and a polyamide resin layer will be explained.

As shown in FIG. 1, the hose having the laminate structure of the rubber layer and the polyamide resin layer comprises a polyamide resin layer 1A, and a rubber layer 2A comprising a rubber composition, the rubber layer formed on an outer peripheral surface of the polyamide resin layer 1A. A hose having such structure is suitably used for an engine cooling hose, such as a radiator hose and a heater hose, in vehicles such as automobiles.

The polyamide resin for use in the polyamide resin layer 1A can be aliphatic and aromatic compounds, although not limited thereto, and may include a lactam polymer, a condensate of diamine and dicarboxylic acid, an amino acid polymer, and copolymers and blends thereof. Examples of suitable polyamide resins include nylon 6, nylon 11, nylon 12, nylon 610, nylon 612, polyphthalamide, a copolymer of nylon 6 and nylon 66, a blend of two or more thereof, and a mixture of clay minerals therewith.

The rubber composition for use in the rubber layer 2A can be obtained using a rubber (A), a vulcanizing agent containing a peroxide (B), a resorcinol compound (C), and a melamine resin (D).

As the rubber (A), at least one of an ethylene-propylene-diene terpolymer (EPDM) and an ethylene-propylene copolymer (EPM) may be used. The EPDM is not especially limited as long as it is used as a substrate of the rubber composition, and may include preferably those rubbers having an iodine number within the range of 6 to 30, and containing 48 to 70% by weight of ethylene, more preferably an iodine number of within the range of 10 to 24, and containing 50 to 60% by weight of ethylene.

A diene monomer contained in the EPDM as the third component is not especially limited, and preferably the monomer includes 5 to 20 carbon atoms. Examples of the diene monomers include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methacryl-5-norbornene, and 2-isopropenyl-5-norbornene. Dicyclopentadiene (DCP) and 5-ethylidene-2-norbornene (ENB) are preferable.

Examples of the vulcanizing agent containing the peroxide (B) used in combination with the rubber (A) include 2,4-dichlorobenzoyl peroxide, benzoyl peroxide, 1,1,-di-t-butylperoxy-3,3,5-trimethylcyclohexane, 2,5-dimethyl-2,5-dibenzoyl peroxyhexane, n-butyl-4,4'-di-t-butyl peroxyvalerate, dicumyl peroxide, t-butylperoxybenzoate, di-t-butylperoxy-diisopropylbenzene, t-butylcumyl peroxide, 2,5-dimethyl-2,5-di-t-butylperoxyhexane, di-t-butyl peroxide, 2,5-dimethyl-2,5-di-t-butylperoxyhexyne-3. These peroxides may be used alone or in combination. Among them, di-t-butylperoxy-diisopropylbenzene is preferably used because its odor level is acceptable.

It is preferable that a mixing percentage of the vulcanizing agent containing the peroxide (B) is 1.5 to 20 parts by weight (hereinafter referred to as "parts") based on 100 parts of the rubber (A). If the amount of the component (B) is less than 1.5 parts, the rubber is insufficiently cross-linked and thus the toughness of the hose is decreased. If the amount of the component (B) exceeds 20 parts, the hose tends to become too hard to provide sufficient flexibility.

The resorcinol compound (C) used in combination with the components (A) and (B) is not especially limited as long as it functions mainly as the adhesive, and this compound may include resorcin, resorcin-formaldehyde (RF) resin, and modified resorcin-formaldehyde resin. These are used alone, or in combination. Among them, modified resorcin-formaldehyde resin is preferably used from the viewpoint of its low transpiration and low moisture adsorption properties, and compatibility with rubber.

The modified resorcin-formaldehyde resin is, for example, represented by the following formulas (1) to (3). Especially preferred are those resins represented by the formula (1):

(1)

wherein R represents a hydrocarbon group and n represents a number of 0 to 3.

(2)

wherein n represents a number of 0 to 3.

(3)

wherein n represents a number of 0 to 3.

A mixing percentage of the resorcinol compound (C) is preferably 0.1 to 10 parts, more preferably 0.5 to 5 parts, based on 100 parts of the rubber (A). If the amount of the resorcinol compound (C) is less than 0.1 parts, the rubber layer does not adhere well to the other layer of, for example, the polyamide resin. If the amount of the resorcinol compound (C) exceeds 10 parts, the costs are increased.

The melamine resin (D) used in combination with the components (A) to (C) is not especially limited as long as it functions as an adhesive adjuvant, and include a methylated formaldehyde-melamine polymer, and hexamethylenetetramine. These are used alone, or in combination. Among them, the methylated formaldehyde-melamine polymer is suitably used from the viewpoint of its low transpiration and low moisture consumption properties, and compatibility with rubber.

The methylated formaldehyde-melamine polymer is, for example, represented by the following formula (4).

(4)

wherein n represents a positive number.

Among the compounds represented by the formula (4), a mixture of the compound wherein n=1, the compound wherein n=2, and the compound wherein n=3 is preferable, and a mixing percentage is preferably 43 to 44% by weight of the compound wherein n=1, 27 to 30% by weight of the compound wherein n=2, and 26 to 30% by weight of the compound wherein n=3.

A weight ratio of the resorcinol compound (C) to the melamine resin (D) is preferably within the range of 1/0.5 to 1/2, more preferably within the range of 1/0.77 to 1/1.5. If the weight ratio of the component (D) is less than 0.5, the tensile strength at break (TB) and the elongation at break (EB) of the rubber layer tend to be decreased. If the weight ratio of the component (D) exceeds 2, adhesion is saturated and fully stabilized. Therefore, even if the weight ratio of the component (D) is increased even more, costs are merely increased and thus there is no significant advantages.

The subject rubber composition preferably includes one or more of carbon black, process oil and the like, in addition to the components (A) to (D).

Also, the rubber composition may include one or more of an anti-aging agent, a processing aid, a cross-linking promoter, a white filler, a reactive monomer, a foaming agent and the like as required.

The rubber composition can be prepared by combining the components (A) to (D), and other components such as those described above as required, and by mixing them using a mixer such as a roll mixer, a kneader, and a Banbury mixer.

For example, the hose shown in FIG. 1 can be produced as follows: The polyamide resin is extruded to form the polyamide resin layer 1A. The rubber composition is extruded on an outer peripheral surface of the resin layer 1A, and vulcanized to form the rubber layer 2A.

The method of producing the hose shown in FIG. 1 is not limited to the above. Alternatively, the polyamide resin layer 1A and the rubber layer 2A may be coextruded.

A thickness of each layer of the thus obtained hose generally depends on the particular application of the hose. The polyamide resin layer 1A generally has a thickness within the range of 0.1 to 1.5 mm, preferably within the range of 0.3 to 1.2 mm. The rubber layer 2A generally has a thickness within the range of 0.5 to 4.0 mm, preferably within the range of 1.0 to 3.0 mm. An inner diameter of the hose depends on the particular application, and generally is within the range of 2 to 60 mm, preferably within the range of 4 to 50 mm.

A construction of the hose according to the present invention comprising the laminate structure of the rubber layer and the material such as the polyamide resin is not limited to the two-layered structure comprising the polyamide resin layer 1A and the rubber layer 2A as shown in FIG. 1. For example, as shown in FIG. 2, an adhesive layer 22A may be formed on an outer peripheral surface of an polyolefin resin layer 21A, the polyamide resin layer 1A may be formed on an outer peripheral surface of the adhesive layer 22A, and the rubber layer 2A may be formed on an outer peripheral surface of the polyamide resin layer 1A.

Non-limiting examples of a material for use in the polyolefin resin layer 21A include polypropylene, polyethylene, polybutylene, and polybutene. Among them, polypropylene is preferably used because of its heat resistance.

Non-limiting examples of a material for use in the adhesive layer 22A include a modified compound such as acid-modified polypropylene, acid-modified polyethylene, amine-modified polypropylene, amine-modified polyethylene, silane-modified polypropylene, and silane-modified polyethylene, and a blend of one of the modified compounds and a a material of a substrate to be adhered.

For example, the hose shown in FIG. 2 can be produced as follows: The materials of polyolefin resin layer 21A, the adhesive layer 22, and the polyamide resin are coextruded to form the adhesive layer 22A on an outer peripheral surface of the polyolefin resin layer 21A, and to form the polyamide resin layer 1A on an outer peripheral surface of the adhesive layer 22A. Then, the rubber composition is extruded, and vulcanized to form the rubber layer 2A.

Still another hose according to the present invention comprising the laminate structure of the rubber layer and the material such as polyamide resin is shown in FIG. 3. A reinforcing layer 31A is formed on an outer peripheral surface of the rubber layer 2A, and a multi-purpose rubber layer 32A is formed on an outer peripheral surface of the reinforcing layer 31A in addition to the layers of the hose shown in FIG. 2.

Examples of a material for use in the reinforcing layer 31A include a polyvinyl alcohol fiber, a polyamide (nylon) fiber, an aramide fiber, a polyethylene terephthalate (PET) fiber, and metal wire.

Examples of a material for use in the multi-purpose rubber layer 32A include a multi-purpose rubber including EPDM, butyl rubber (IIR), halogenated butyl rubber (Cl-IIR, Br-IIR), isoprene rubber (IR), urethane rubber, chloroprene rubber (CR), epichlorohydrin rubber (ECO), and fluoro rubber. Among them, EPDM is preferably used since it is relatively inexpensive.

For example, the hose shown in FIG. 3 can be produced as follows: The adhesive layer 22A is formed on an outer peripheral surface of the polyolefin resin layer 21A, the polyamide resin layer 1A is formed on an outer peripheral surface of the adhesive layer 22A, and the rubber layer 2A is formed on an outer peripheral surface of the polyamide resin layer 1A. The polyvinyl alcohol fiber or the like is cross-knitted on an outer peripheral surface of the rubber layer 2A to form the reinforcing layer 31A. Then, the multi-purpose rubber, e.g., EPDM, is extruded on an outer peripheral surface of the reinforcing layer 31A, and vulcanized to form the multi-purpose rubber layer 32A.

Now, referring to FIGS. 4 to 6, a hose according to the present invention comprising the laminate structure of the rubber layer and an EVOH layer will be described below.

Figure 4:
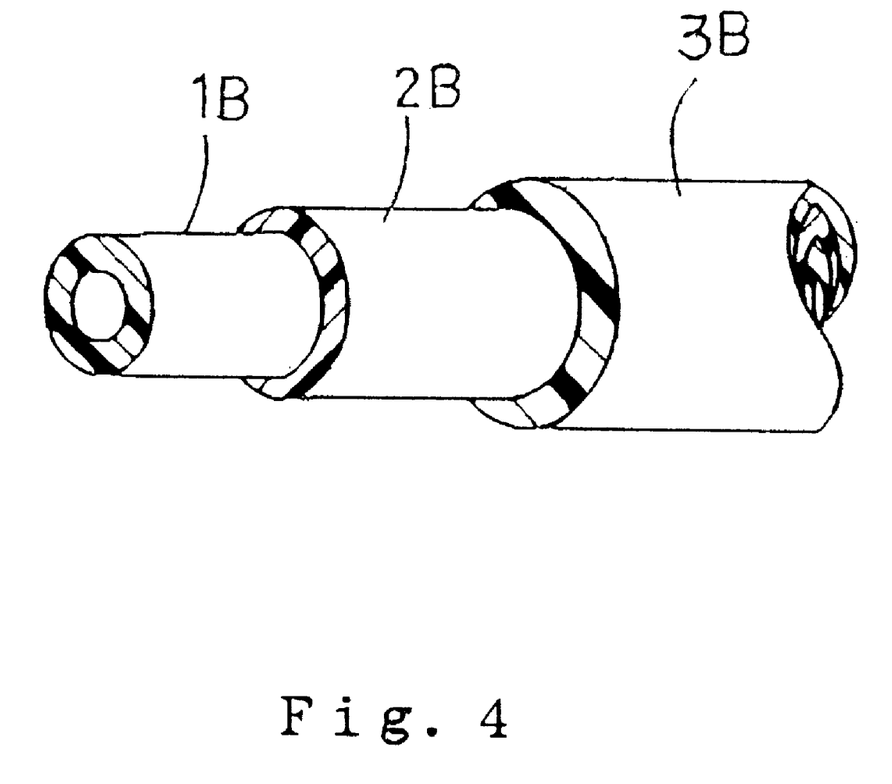
FIG. 4 is a perspective view showing one embodiment of a hose according to the present invention having a laminate structure of a rubber layer and an EVOH layer.
Figure 5:
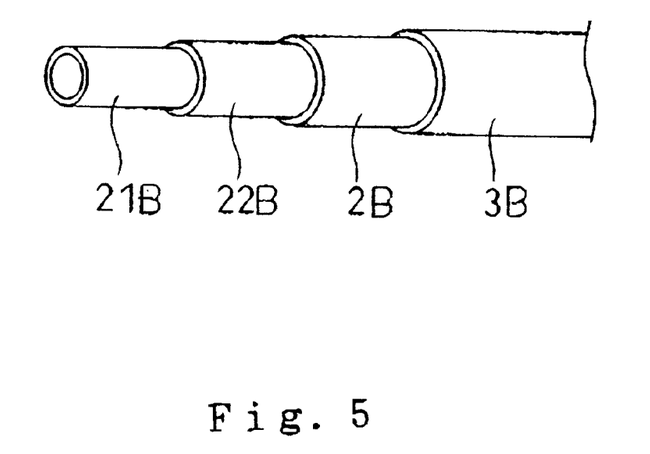
FIG. 5 is a perspective view showing another embodiment of a hose according to the present invention having a laminate structure of a rubber layer and an EVOH layer.

As shown in FIG. 4, the hose is formed by forming an EVOH layer 2B on an outer peripheral surface of a polyamide resin layer 1B, and a rubber layer 3B comprising the previously described rubber composition on an outer peripheral surface of the EVOH layer 2B. Such hose is suitably used as an automobile hose such as a gasoline fuel hose.

The polyamide resin for use in the polyamide resin layer 1B is described above in the polyamide resin for use in the polyamide resin layer 1A.

The EVOH for use in the EVOH layer 2B is not especially limited, and generally has a melt flow rate (MFR), or melt index, of 1 to 10 g/10 min, preferably 1 to 6 g/10 min, as measured according to ASTM D 1238, at 190° C. and 2.16 kg.

The rubber composition for use in the rubber layer 3B can be obtained using the rubber (A), the vulcanizing agent containing a peroxide (B), the resorcinol compound (C), and the melamine resin (D) as previously described.

For example, the hose shown in FIG. 4 can be produced as follows: The polyamide resin and the EVOH are coextruded to form the EVOH layer 2B on an outer peripheral surface of the polyamide resin layer 1B. The rubber composition is extruded, and then vulcanized to form the rubber layer 3B.

The method of producing the hose shown in FIG. 4 is not limited to the above. Alternatively, the polyamide resin layer 1B, the EVOH layer 2B, and the rubber layer 3B may be coextruded.

The thickness of each layer of the thus obtained hose depends on the particular application of the hose. The polyamide resin layer 1B generally has a thickness within the range of 0.1 to 1.5 mm, preferably within the range of 0.3 to 1.0 mm. The EVOH layer 2B generally has a thickness within the range of 0.1 to 1.0 mm, preferably within the range of 0.2 to 0.7 mm. The rubber layer 3B generally has a thickness within the range of 0.5 to 4.0 mm, preferably within the range of 1.0 to 3.0 mm. The inner diameter of the hose depends on the particular application, and generally is within the range of 2 to 60 mm, preferably within the range of 4 to 50 mm.

A construction of the hose according to the present invention comprising the laminate structure of the rubber layer and the EVOH layer is not limited to the three-layered structure comprising the polyamide resin layer 1B, the EVOH layer 2B, and the rubber layer 3B as shown in FIG. 4. For example, as shown in FIG. 5, an adhesive layer 22B may be formed on an outer peripheral surface of an polyolefin resin layer 21B, the EVOH layer 2B may be formed on an outer peripheral surface of the adhesive layer 22B, and the rubber layer 3B may be formed on an outer peripheral surface of the EVOH layer 2B.

Materials for use in the polyolefin resin layer 21B and the adhesive layer 22B are described above.

For example, the hose shown in FIG. 5 can be produced as follows: The materials of the polyolefin resin layer 21B, the adhesive layer 22, and the EVOH resin are coextruded to form the adhesive layer 22B on an outer peripheral surface of the polyolefin resin layer 21B, and to form the EVOH layer 2B on an outer peripheral surface of the adhesive layer 22B. Then, the rubber composition is extruded, and vulcanized to form the rubber layer 3B.

Figure 6:
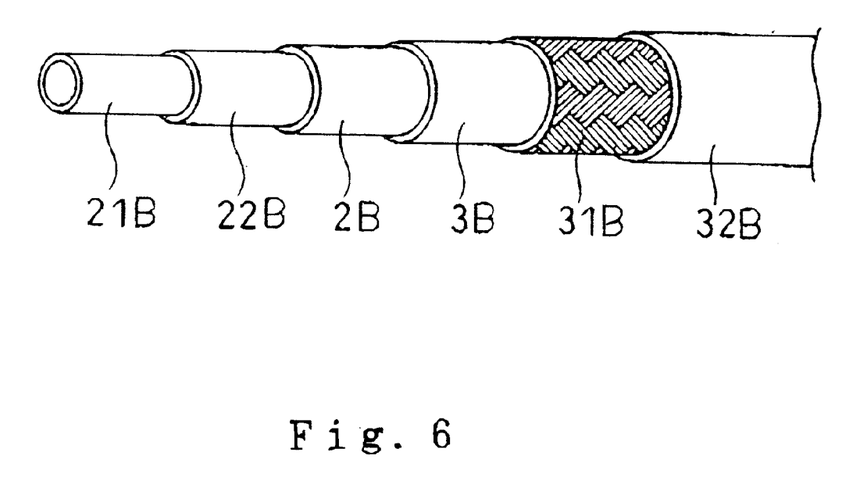
FIG. 6 is a perspective view showing yet another embodiment of a hose according to the present invention having a laminate structure of a rubber layer and an EVOH layer.

Still another hose according to the present invention comprising the laminate structure of the rubber layer and the EVOH layer is shown in FIG. 6. In the hose shown in FIG. 6, a reinforcing layer 31B is additionally formed on an outer peripheral surface of the rubber layer 3B, and a multi-purpose rubber layer 32B is formed on an outer peripheral surface of the reinforcing layer 31B.

Material for use in the reinforcing layer 31B and the multi-purpose rubber layer 32B are described above.

For example, the hose shown in FIG. 6 can be produced as follows: As shown in FIG. 5, the adhesive layer 22B is formed on an outer peripheral surface of the polyolefin resin layer 21B, the EVOH layer 2B is formed on an outer peripheral surface of the adhesive layer 22B, and the rubber layer 3B is formed on an outer peripheral surface of the EVOH layer 2B. The polyvinyl alcohol fiber or the like is cross-knitted on an outer peripheral surface of the rubber layer 3B to form the reinforcing layer 31B. Then, the multi-purpose rubber, e.g., EPDM, is extruded on an outer peripheral surface of the reinforcing layer 31B, and vulcanized to form the multi-purpose rubber layer 32B.

Now, referring to FIG. 7, a hose according to the present invention comprising the laminate structure of the rubber layer and the metal layer will be described below.

Figure 7:
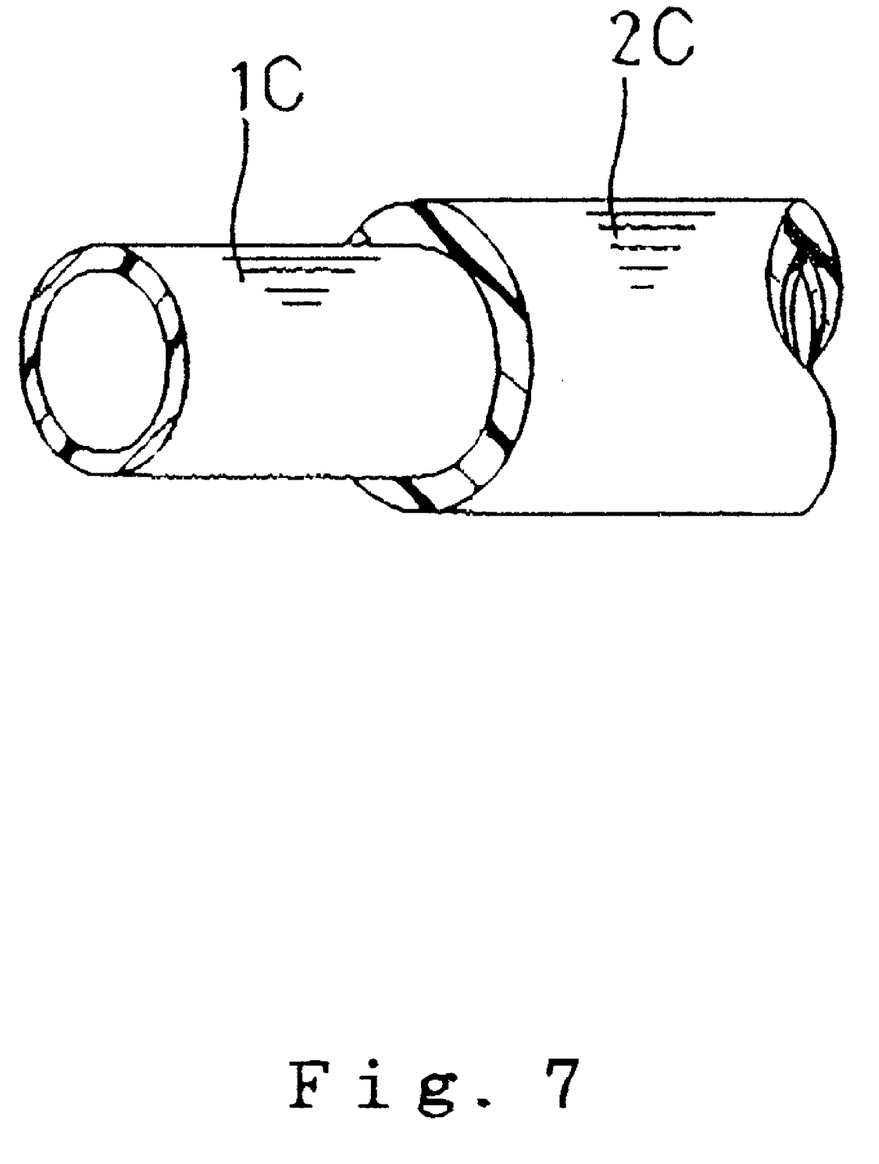
FIG. 7 is a perspective view showing one embodiment of a hose according to the present invention having a laminate structure of a rubber layer and a metal layer.

As shown in FIG. 7, the hose is formed by forming a rubber layer comprising a specific rubber composition 2C on an outer peripheral surface of a metal layer 1C. Such hose is suitably used as fuel cell automobile hoses such as a methanol fuel hose and a hydrogen fuel hose.

Examples of the metal for use in the metal layer 1C include iron, iron alloys (e.g., SUS), aluminum, aluminum alloys, copper, titanium, silver, and nickel. Among them, SUS and aluminum are preferably used from the viewpoint of minimizing weight. It is preferable that a metal foil (metal film) or the like be used for more weight reduction. The metal foil (metal film) generally has the thickness within the range of 8 to 400 μm, preferably within the range of 15 to 300 μm. A part or whole length of the metal may have a bellows shape to add flexibility.

A material of the rubber layer 2C is described above.

For example, the hose shown in FIG. 7 can be produced as follows: A long metal pipe is provided. The rubber composition is extruded onto the metal pipe, and is vulcanized.

The method of producing the hose shown in FIG. 7 is not limited to the above. Alternatively, a metal foil is wrapped around a mandrel, and ends of the metal foil are welded in the longitudinal direction. The rubber composition is extruded thereon, and vulcanized.

The thickness of each layer of the thus obtained hose depends on the particular application of the hose. The metal layer 1C generally has a thickness within the range of 8 µm to 0.4 mm, preferably within the range of 15 µm to 0.3 mm with a balance of flexibility and gas permeation resistance taken into consideration. The rubber layer 2C generally has a thickness within the range of 0.5 to 4 mm, preferably within the range of 1 to 3 mm. The inner diameter of the hose depends on the particular application, and generally is within the range of 2 to 40 mm, preferably within the range of 4 to 35 mm.

A construction of the hose according to the present invention comprising the laminate structure of the rubber layer and the metal layer is not limited to the two-layered structure comprising the metal layer 1C and the rubber layer 2C as shown in FIG. 7. For example, an innermost layer comprising fluororesin may be formed onto an inner peripheral surface of the metal layer 1C, and an outermost layer comprising other materials may be formed on an outer peripheral surface of the rubber layer 2C. Depending on the particular application of the hose, the rubber layer can be an inner layer, and the metal layer can be an outer layer. The shape of the metal layer 1C is not especially limited, and any shapes including a straight pipe and bellows may be used.

Hitherto, few vehicles utilizing a methanol fuel (which may be mixed with gasoline) and hydrogen fuel existed. Correspondingly, dedicated hoses for use in such vehicles have not been developed. However, in the next generation of automobiles, it is planned to utilize a fuel cell which uses the methanol fuel and the hydrogen fuel. Accordingly, there is a need to develop hoses for use in automobiles containing fuel cell including the methanol fuel and the hydrogen fuel. At present, a metal pipe such as stainless steel (SUS) is being used in experimental fuel cell vehicles by automobile manufacturers for the fuel cell hoses such as the methanol fuel hose and the hydrogen fuel hose. Metal was selected for these hoses from the view point of methanol permeability resistance, and hydrogen permeability resistance. However, a metal hose or pipe has significant drawbacks such as heavy weight, over-consumed fuel, and increased costs. The hose according to the present invention as shown in FIG. 7 comprises the rubber layer 2C comprising the rubber composition formed on an outer peripheral surface of the metal layer 1C, whereby the costs and weight can be decreased as compared with the conventional metal pipe. Consequently, when the hose of the present invention is used for automobile hose such as the hoses for an automobile fuel cell, the light-weight hose can improve fuel consumption, and the rubber layer can absorb vehicle vibration.

A hose according to the present invention which has an appropriate combination of layers can be suitable for a gasoline fuel hose, an automobile fuel cell hose (methanol fuel hose, hydrogen fuel hose), an engine cooling hose such as a radiator hose that is used for connecting an engine and a radiator in an automobile and a heater hose that is used for connecting the engine and a heater core, and a refrigerant conveying hose for a cooler or air conditioner. When EPDM is used for the gasoline fuel hose, it is desirable that the rubber layer comprising the subject rubber composition be used as a layer other than the inner layer, for example, as the outer layer, since EPDM has poor gasoline resistance.

Other features of this invention will become apparent in the course of the following Examples, which are given for illustration of the invention and are not intended to be limiting thereof.

The following rubber compositions used in Examples and Comparative Examples were prepared.

Rubber Composition A

The following components were mixed and kneaded in a roll to prepare a rubber composition A.

|  | (Parts by Weight) |
|---|---|
| Rubber (A): | |
| EPDM (Tradename "Esprene 501A" made by Sumitomo Chemical Co., Ltd., with iodine number of 12, ethylene ratio of 50% by weight, Mooney viscosity (ML1 + 4 100° C.) of 43) | 100 |
| Carbon black (Tradename "Seast SO" made by Tokai Carbon Co., Ltd.) | 100 |
| Process oil (Tradename "Diana process PW-380" made by Idemitsu Kosan Co., Ltd. | 60 |
| Peroxide vulcanizing agent (B): | |
| Di-t-butylperoxy-diisopropylbenzen (Tradename "Peroximon F-40" made by NOF CORPORATION) | 4.2 |
| Resorcinol compound (C): | |
| Modified resorcin-formaldehyde resin (Tradename "Sumicanol 620" made by Sumitomo Chemical Co., Ltd.) | 1 |
| Melamine resin (D): | |
| Methylated formaldehyde-melamine polymer (Tradename "Sumicanol 507A" made by Sumitomo Chemical Co., Ltd.) | 0.77 |

Rubber Composition B

The procedure for preparation of the rubber composition A was repeated except that 5 parts of Sumicanol 620 was used, and that 3.85 parts of Sumicanol 507A was used to provide a rubber composition B.

Rubber Composition C

The procedure for preparation of the rubber composition A was repeated except that 10 parts of Sumicanol 620 was used, and that 3.85 parts of Sumicanol 507A was used to provide a rubber composition C.

Rubber Composition D

The procedure for preparation of the rubber composition A was repeated except that 0.5 parts of Sumicanol 507A was used to provide a rubber composition D.

Rubber Composition E

The procedure for preparation of the rubber composition A was repeated except that 2 parts of Sumicanol 507A was used to provide a rubber composition E.

Rubber Composition F

The procedure for preparation of the rubber composition A was repeated except that 0.1 parts of Sumicanol 620 was used, and that 0.05 parts of Sumicanol 507A was used to provide a rubber composition F.

Rubber Composition G

The procedure for preparation of the rubber composition A was repeated except that EPM (tradename "Esprene 201" made by Sumitomo chemical Co., Ltd.) was used instead of EPDM to provide a rubber composition G.

Rubber Composition a

The procedure for preparation of the rubber composition A was repeated except that both of Sumicanol 620 and 507A were not used to provide a rubber composition "a".

Rubber Composition b

The procedure for preparation of the rubber composition A was repeated except that Sumicanol 507A was not used to provide a rubber composition "b".

Rubber Composition c

The procedure for preparation of the rubber composition A was repeated except that Sumicanol 620 was not used, and that 1 part of Sumicanol 507A was used to provide a rubber composition c.

Rubber Composition d

The procedure for preparation of the rubber composition A was repeated except that 0.75 parts of tetramethylthiuram disulfide (tradename "Sanceler TT" made by Sanshin Chemical Industry Co., Ltd.), 0.75 parts of zinc dimethyldithiocarbamate (tradename "Sanceler PZ" made by Sanshin Chemical Industry Co., Ltd.), 0.5 parts of mercaptobenzothiazole (tradename "Sanceler M" made by Sanshin Chemical Industry Co., Ltd.), all of which are vulcanizing accelerators, and 1.5 parts of sulfur, which is a vulcanizing agent, were used instead of 4.2 parts of the peroxide vulcanizing agent to provide a rubber composition "d".

Using the aforementioned rubber compositions, hoses were produced as described below.

EXAMPLE 1A

Polyamide 6 was extruded to form a polyamide resin layer having an inner diameter of 6 mm and a thickness of 1 mm. On an outer peripheral surface of the polyamide resin layer, the rubber composition A was extruded and then vulcanized at 160° C. for 45 minutes to form a rubber layer having a thickness of 2 mm. Thus, a hose as shown in FIG. 1 was produced.

EXAMPLES 2A to 7A

Comparative Examples 1A to 5A

The procedure for production of the hose in Example 1A was repeated except that rubber compositions for producing the outer layer shown in TABLES 1 and 2 below were used. In Comparative Example 2A, a rubber adhesive was coated on an outer peripheral surface of the polyamide resin layer, and then the rubber layer was formed.

EXAMPLE 8A

Polypropylene (tradename "Noblen" made by Sumitomo Chemical Co., Ltd.) for use in a polyolefin resin layer, acid-modified polypropylene (tradename "Adomer QF500" made by Mitsui Chemicals, Inc.) for use in an adhesive layer, and polyamide 6 were coextruded to form the adhesive layer having a thickness of 0.1 mm on an outer peripheral surface of the polyolefin resin layer having an inner diameter of 25 mm, and a thickness of 0.5 mm, and the polyamide resin layer having a thickness of 1.0 mm on an outer peripheral surface of the adhesive layer. On a surface of the polyamide resin layer, the rubber composition A was extruded and then vulcanized at 150° C. for 60 minutes to form a rubber layer having a thickness of 4 mm, whereby a hose as shown in FIG. 2 was produced.

EXAMPLE 9A

The procedure for production of the hose in Example 8A was repeated except that a polyvinyl alcohol fiber with 1670 dtex (tradename "Vinylon #7903" made by Kuraray Co., Ltd.) was cross-knitted on an outer peripheral surface of the rubber layer to form a reinforcing layer, and EPDM (tradename "Esprene 501A" made by Sumitomo Chemical Co., Ltd.) was extruded and vulcanized at 150° C. for 60 minutes to form a multi-purpose rubber layer having a thickness of 2 mm on an outer peripheral surface of the reinforcing layer, whereby a hose as shown in FIG. 3 was produced.

Various properties of the hoses thus obtained in Examples and Comparative Examples were evaluated in accordance with the following standards. TABLES 1 and 2 show the results as well as tensile strength at break (TB) and elongation at break (EB) of the rubber compositions.

Tensile Strength at Break (TB), Elongation at Break (EB)

Each of the rubber compositions was press-vulcanized at 160° C. for 45 minutes to produce a vulcanized rubber sheet having a thickness of 2 mm. The rubber sheet was punched out using the JIS No. 5 dumbbell to evaluate the TB and the EB in accordance with JIS K 6251. The higher the values of the TB and the EB, the better is the quality.

Adhesion

Each of the hoses was cut into a specimen having a width of 20 mm, and a length of 100 mm. The specimen was mounted on a tensile tester (JIS B 7721). The rubber layer of the specimen was fixed, and the polyamide resin layer was pulled at a rate of 50 mm/min to evaluate adhesion (kg/25 mm). At the same time, an interface between the rubber layer and the polyamide resin layer was visually inspected for evaluating a peeling status of the layers. When the rubber layer was broken, the hose was graded as "good." When the layers were peeled, the hose was graded as "poor."

Over-all Judgment

When the hose did not require coating of the adhesive on the interface between the rubber layer and the polyamide resin layer, and had an excellent adhesion between the rubber layer and the polyamide resin layer, such hose was graded as "good." When the hose had poor adhesion between the rubber layer and the polyamide resin layer, regardless of applying the adhesive to the interface therebetween, or had poor adhesion between the rubber layer and the polyamide resin layer although it was not required to apply the adhesive to the interface therebetween, such a hose was graded as "poor."

TABLE 1

|  | Examples | | | | | | |
| --- | --- | --- | --- | --- | --- | --- | --- |
|  | 1A | 2A | 3A | 4A | 5A | 6A | 7A |
| Rubber composition | A | B | C | D | E | F | G |
| TB(MPa) | 13.0 | 10.5 | 8.2 | 13.0 | 11.0 | 13.8 | 7.5 |
| EB(%) | 250 | 250 | 230 | 250 | 250 | 260 | 450 |
| Adhesive coating | — | — | — | — | — | — | — |
| Adhesion (kg/25 mm) | 8.8 | 8.6 | 9.2 | 7.8 | 8.4 | 6.4 | 8.5 |
| Peeling status | good | good | good | good | good | good | good |
| Over-all judgment | good | good | good | good | good | good | good |

TABLE 2

| | Comparative Examples | | | | |
|---|---|---|---|---|---|
| | 1A | 2A | 3A | 4A | 5A |
| Rubber composition | a | a | b | c | d |
| TB(MPa) | 14.0 | 14.0 | 13.0 | 14.0 | 13.3 |
| EB(%) | 260 | 260 | 300 | 270 | 500 |
| Adhesive coating | — | coated | — | — | — |
| Adhesion (kg/25 mm) | 0.2 | 2.8 | 1.2 | 1.0 | 1.8 |
| Peeling status | poor | poor | poor | poor | poor |
| Over-all judgment | poor | poor | poor | poor | poor |

It is apparent that the hoses in the Examples have excellent adhesion between the rubber layer and the polyamide resin layer, since the hoses use the rubber compositions comprising the resorcinol compound and the melamine resin. The hoses in Examples 8A and 9A are not shown in TABLE 1, but they gave the same results as the hose in Example 1A.

In sharp contrast, it is apparent that the hose in Comparative Example 1A has extremely poor adhesion, since it uses the rubber composition "a" containing no adhesive component. The hose in Comparative Example 2A includes adhesive between the polyamide resin layer and the rubber layer, but has less adhesion than that of the hoses in Examples, which had interface peeling. The hose in Comparative Example 3A uses the rubber composition "b" containing only the resorcinol compound and no melamine resin, and therefore has poor adhesion, resulting in interface peeling. The hose in Comparative Example 4A uses the rubber composition "c" containing only the melamine resin and no resorcinol compound, and therefore has poor adhesion, resulting in interface peeling. The hose in Comparative Example 5A uses the rubber composition containing the adhesive component, but did not use a peroxide vulcanizing agent but rather a sulfur vulcanizing agent, and therefore had poor adhesion, resulting in interface peeling. This may be because the sulfur vulcanizing agent has a faster vulcanizing rate than that of the peroxide vulcanizing agent, and the rubber layer itself is vulcanized before the rubber layer is adhered to the polyamide resin layer.

Using the aforementioned rubber compositions, hoses were produced as described below.

EXAMPLE 1B

Polyamide 6 was extruded to form a polyamide resin layer having an inner diameter of 6 mm and a thickness of 0.8 mm was formed. On an outer peripheral surface of the polyamide resin layer, EVOH (tradename "Eval EP-F101" made by Kuraray Co., Ltd., with MFR=1.3 g/10 min) was extruded to form an EVOH layer having a thickness of 0.2 mm. On an outer peripheral surface of the EVOH layer, the rubber composition A was extruded and vulcanized at 160° C. for 45 minutes to form a rubber layer having a thickness of 2 mm. Thus, a hose as shown in FIG. 4 was produced.

EXAMPLES 2B to 7B

Comparative Examples 1B to 5B

The procedure for production of the hose in Example 1B was repeated except that the rubber compositions for producing the outer layer shown in TABLES 3 and 4 below were used. In Comparative Example 2B, a rubber adhesive was coated on an outer peripheral surface of the EVOH layer, and then the rubber layer was formed thereon.

EXAMPLE 8B

Polypropylene (tradename "Noblen" made by Sumitomo Chemical Co., Ltd.) for use in a polyolefin resin layer, acid-modified polypropylene (tradename "Adomer QF500" made by Mitsui Chemicals, Inc.) for use in an adhesive layer, and EVOH (tradename "Eval EP-F101" made by Kuraray Co., Ltd., with MFR=1.3 g/10 min) were coextruded to form the adhesive layer having a thickness of 0.1 mm on an outer peripheral surface of the polyolefin resin layer having an inner diameter of 25 mm, and a thickness of 0.5 mm, and the EVOH layer having a thickness of 0.5 mm on an outer peripheral surface of the adhesive layer. On an outer peripheral surface of the EVOH layer, the rubber composition A was extruded and vulcanized at 150° C. for 60 minutes to form a rubber layer having a thickness of 4 mm, whereby a hose as shown in FIG. 5 was produced.

EXAMPLE 9B

The procedure for production of the hose in Example 8B was repeated except that a polyvinyl alcohol fiber with 1670 dtex (tradename "Vinylon #7903" made by Kuraray Co., Ltd.) was cross-knitted on an outer peripheral surface of the EVOH layer to form a reinforcing layer, and EPDM (tradename "Esprene 501A" made by Sumitomo Chemical Co., Ltd.) was extruded and vulcanized at 150° C. for 60 minutes to form a multi-purpose rubber layer having a thickness of 2 mm on an outer peripheral surface of the reinforcing layer, whereby a hose as shown in FIG. 6 was produced.

Various properties of the hoses thus obtained in the above Examples and Comparative Examples were evaluated in accordance with the following standards. TABLES 3 and 4 show the results as well as tensile strength at break (TB) and elongation at break (EB) of the rubber compositions.

Tensile Strength at Break (TB), Elongation at Break (EB)

Each of the rubber compositions was press-vulcanized at 160° C. for 45 minutes to produce a vulcanized rubber sheet having a thickness of 2 mm. The rubber sheet was punched out using the JIS No. 5 dumbbell to evaluate the TB and the EB in accordance with JIS K 6251. The higher the values of the TB and the EB, the better is the quality.

Adhesion

Each of the hoses was cut into a specimen having a width of 20 mm, and a length of 100 mm. The specimen was mounted on a tensile tester (JIS B 7721). The rubber layer of the specimen was fixed, and the EVOH resin layer was pulled at a rate of 50 mm/min to evaluate adhesion (kg/25 mm). At the same time, an interface between the rubber layer and the EVOH layer was visually inspected for evaluating a peeling status of the layers. When the rubber layer was broken, the hose was graded as "good." When the layers were peeled, the hose was graded as "poor."

Over-all Judgment

When the hose did not require coating of the adhesive on the interface between the rubber layer and the EVOH layer, and had an excellent adhesion between the rubber layer and the EVOH layer, such hose was graded as "good." When the hose had poor adhesion between the rubber layer and the EVOH layer, regardless of applying the adhesive to the interface therebetween, or had poor adhesion between the rubber layer and the EVOH layer although it was not required to apply the adhesive to the interface therebetween, such a hose was graded as "poor."

TABLE 3

| | Examples | | | | | | |
|---|---|---|---|---|---|---|---|
| | 1B | 2B | 3B | 4B | 5B | 6B | 7B |
| Rubber composition | A | B | C | D | E | F | G |
| TB(MPa) | 13.0 | 10.5 | 8.2 | 13.0 | 11.0 | 13.8 | 7.5 |
| EB(%) | 250 | 250 | 230 | 250 | 250 | 260 | 450 |
| Adhesive coating | — | — | — | — | — | — | — |
| Adhesion (kg/25 mm) | 2.5 | 2.8 | 2.8 | 2.8 | 2.8 | 2.4 | 9.0 |
| Peeling status | good | good | good | good | good | good | good |
| Over-all judgment | good | good | good | good | good | good | good |

TABLE 4

| | Comparative Examples | | | | |
|---|---|---|---|---|---|
| | 1B | 2B | 3B | 4B | 5B |
| Rubber composition | a | a | b | c | d |
| TB(MPa) | 14.0 | | 13.0 | 14.0 | 13.3 |
| EB(%) | 260 | | 300 | 270 | 500 |
| Adhesive coating | — | coated | — | — | — |
| Adhesion (kg/25 mm) | 0.2 | 2.2 | 1.0 | 1.2 | 1.2 |
| Peeling status | poor | poor | poor | poor | poor |
| Over-all judgment | poor | poor | poor | poor | poor |

It is apparent that the hoses in the Examples have excellent adhesion between the rubber layer and the EVOH layer, since the hoses use the rubber compositions comprising the resorcinol compound and the melamine resin. The results for the hoses in Examples 8B and 9B are not shown in TABLE 3, but they gave the same results as the hose in Example 1B.

In sharp contrast, it is apparent that the hose in Comparative Example 1B has extremely poor adhesion, since it uses the rubber composition "a" containing no adhesive component. The hose in comparative Example 2B includes adhesive between the EVOH layer and the rubber layer, but has less adhesion than that of the hoses in Examples, which had interface peeling. The hose in Comparative Example 3B uses the rubber composition "b" containing only the resorcinol compound and no melamine resin, and therefore has poor adhesion, resulting in interface peeling. The hose in comparative Example 4B uses the rubber composition "c" containing only the melamine resin and no resorcinol compound, and therefore has poor adhesion, resulting in interface peeling. The hose in Comparative Example 5B uses the rubber composition containing the adhesive component, but did not use a peroxide vulcanizing agent but rather a sulfur vulcanizing agent, and therefore has poor adhesion, resulting in interface peeling. This may be because the sulfur vulcanizing agent has a faster vulcanizing rate than that of the peroxide vulcanizing agent, and the rubber layer itself is vulcanized before the rubber layer is adhered to the EVOH.

Using the aforementioned rubber compositions, hoses were produced as described below.

EXAMPLE 1C

A long SUS pipe having an inner diameter of 25 mm, and a thickness of 150 μm was provided. On an outer peripheral surface of the pipe, the rubber composition was extruded and vulcanized at 160° C. for 45 minutes to form a rubber layer having a thickness of 2 mm. Thus, a hose as shown in FIG. 7 was produced.

EXAMPLES 2C to 7C

Comparative Examples 1C to 5C

The procedure for production of the hose in Example 1C was repeated except that rubber compositions for producing the outer layer shown in TABLES 5 and 6 below were used. In Comparative Example 2C, a rubber adhesive was coated on an outer peripheral surface of a metal layer, and then the rubber layer was formed thereon.

Various properties of the hoses thus obtained in Examples and comparative Examples were evaluated in accordance with the following standards. TABLES 5 and 6 show the results as well as tensile strength at break (TB) and elongation at break (EB) of the rubber compositions.

Tensile Strength at Break (TB), Elongation at Break (EB)

Each of the rubber compositions was press-vulcanized at 160° C. for 45 minutes to produce a vulcanized rubber sheet having a thickness of 2 mm. The rubber sheet was punched out using the JIS No. 5 dumbbell to evaluate the TB and the EB in accordance with JIS K 6251. The higher the values of the TB and the EB, the better is the quality.

Adhesion

Each of the hoses was cut into a specimen having a width of 20 mm, and a length of 100 mm. The specimen was mounted on a tensile tester (JIS B 7721). The rubber layer of the specimen was fixed, and the metal layer was pulled at a rate of 50 mm/min to evaluate adhesion (kg/25 mm). At the same time, an interface between the rubber layer and the metal layer was visually inspected for evaluating a peeling status of the layers. When the rubber layer was broken, the hose was graded as "good." When the layers were peeled, the hose was graded as "poor."

Over-all Judgment

When the hose did not require coating of the adhesive on the interface between the rubber layer and the metal layer, and had an excellent adhesion between the rubber layer and the metal layer, such hose was graded as "good." When the hose had poor adhesion between the rubber layer and the metal layer, regardless of applying the adhesive to the interface therebetween, or had poor adhesion between the rubber layer and the metal layer although it was not required to apply the adhesive to the interface therebetween, such a hose was graded as "poor."

TABLE 5

| | Examples | | | | | | |
|---|---|---|---|---|---|---|---|
| | 1C | 2C | 3C | 4C | 5C | 6C | 7C |
| Rubber composition | A | B | C | D | E | F | G |
| TB(MPa) | 13.0 | 10.5 | 8.2 | 13.0 | 11.0 | 13.8 | 7.5 |
| EB(%) | 250 | 250 | 230 | 250 | 250 | 260 | 450 |
| Adhesive coating | — | — | — | — | — | — | — |
| Adhesion (kg/25 mm) | 10.2 | 8.8 | 9.8 | 8.6 | 9.4 | 7.0 | 9.9 |
| Peeling status | good | good | good | good | good | good | good |
| Over-all judgment | good | good | good | good | good | good | good |

TABLE 6

| | Comparative Examples | | | | |
|---|---|---|---|---|---|
| | 1C | 2C | 3C | 4C | 5C |
| Rubber composition | a | a | b | c | d |
| TB(MPa) | 14.0 | | 13.0 | 14.0 | 13.3 |
| EB(%) | 260 | | 300 | 270 | 500 |
| Adhesive coating | — | coated | — | — | — |
| Adhesion (kg/25 mm) | 0.2 | 1.0 | 0.8 | 0.8 | 0.6 |

TABLE 6-continued

| | Comparative Examples | | | | |
|---|---|---|---|---|---|
| | 1C | 2C | 3C | 4C | 5C |
| Rubber composition | a | a | b | c | d |
| Peeling status | poor | poor | poor | poor | poor |
| Over-all judgment | poor | poor | poor | poor | poor |

It is apparent that the hoses in the Examples have excellent adhesion between the rubber layer and the metal layer, since the hoses use the rubber compositions comprising the resorcinol compound and the melamine resin.

In sharp contrast, it is apparent that the hose in Comparative Example 1C has extremely poor adhesion, since it uses the rubber composition "a" containing no adhesive component. The hose in Comparative Example 2C includes adhesive between the metal layer and the rubber layer, but has less adhesion than that of the hoses in the Examples, which had interface peeling. The hose in Comparative Example 3C uses the rubber composition "b" containing only the resorcinol compound and no melamine resin, and therefore has poor adhesion, resulting in interface peeling. The hose in Comparative Example 4C uses the rubber composition "c" containing only the melamine resin and no resorcinol compound, and therefore has poor adhesion, resulting in interface peeling. The hose in comparative Example 5C uses the rubber composition containing the adhesive component, but did not use a peroxide vulcanizing agent but rather a sulfur vulcanizing agent, and therefore has poor adhesion, resulting in interface peeling. This may be because the sulfur vulcanizing agent has a faster vulcanizing rate than that of the peroxide vulcanizing agent, and the rubber layer itself is vulcanized before the rubber layer is adhered to the metal layer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A hose, comprising a laminate including a rubber layer comprising a rubber composition containing as essential components (A)–(D), wherein:

(A) a rubber made of at least one material selected from the group consisting of an ethylene-propylene-diene terpolymer and an ethylene-propylene copolymer,

(B) a vulcanizing agent containing a peroxide, (C) a resorcinol compound selected from the group consisting of those represented by the following general formulae (1) to (3), and

(1)

wherein R represents a hydrocarbon group and n represents a number of 0 to 3, (2)

wherein n represents a number of 0 to 3, (3)

wherein n represents a number of 0 to 3, (D) a melamine resin; and a layer made of at least one material selected from the group consisting of a polyamide resin, an ethylene-vinyl alcohol copolymer, and a metal.

2. A hose according to claim 1, a weight ratio of the components (C)/(D) is within the range of 1/0.5 to 1/2.

3. A hose according to claim 2, the amount of the component (C) is 0.1 to 10 parts by weight based on 100 parts by weight of the component (A).

4. A hose according to claim 1, the amount of the component (C) is 0.1 to 10 parts by weight based on 100 parts by weight of the component (A).

5. A hose according to claim 1, the melamine resin of the component (D) is the methylated formaldehyde-melamine polymer represented by the following formula (4):

(4)

wherein n represents a positive number.

* * * * *